(12) United States Patent
Windrem

(10) Patent No.: US 6,597,376 B1
(45) Date of Patent: Jul. 22, 2003

(54) MIX/EFFECT STATUS DISPLAY

(75) Inventor: Kevin D. Windrem, Grass Valley, CA (US)

(73) Assignee: Grass Valley (U.S.) Inc., Nevada City, CA (US)

( * ) Notice: Subject to any disclaimer, the term of this patent is extended or adjusted under 35 U.S.C. 154(b) by 0 days.

(21) Appl. No.: 09/365,330

(22) Filed: Jul. 30, 1999

(51) Int. Cl.[7] .................................................. G09G 5/00
(52) U.S. Cl. ...................................... 345/726; 345/771
(58) Field of Search .......................... 345/726, 719–725, 345/738–739, 771, 772–773, 774–776, 826–827, 832–833, 808–809, 754, 727–729

(56) References Cited

U.S. PATENT DOCUMENTS

| | | | | |
|---|---|---|---|---|
| 6,057,833 A | * | 5/2000 | Heidmann et al. | 345/726 |
| 6,091,407 A | * | 7/2000 | Boetje et al. | 345/721 |
| 6,100,857 A | * | 8/2000 | Tani et al. | 345/1 |
| 6,320,598 B2 | * | 11/2001 | Davis et al. | 345/648 |
| 6,331,864 B1 | * | 12/2001 | Coco et al. | 348/763 |

* cited by examiner

Primary Examiner—Steven Sax
(74) Attorney, Agent, or Firm—Joseph S. Tripoli; Harvey D. Fried; Francis A. Davenport

(57) ABSTRACT

A mix/effect status display provides simultaneous information about each keyer and bus associated with a mix/effect bank without consuming the real estate required for the conventional button/knob per function approach. Also the sources coupled to the M/E buses are shown together with the transition status if a transition is in progress. A switcher working buffer has information about the switcher control panel controls, and transfers that information that relates to the mix/effects banks to a mix/effects status display driver. The driver provided the mix/effects status display with a row for each bus associated with the M/E and all information related to the source coupled to that bus together with information about the M/E operating mode and transition status, type and interval. Thus an operator has a complete picture of M/E status without requiring substantial additional real estate on the switcher control panel.

2 Claims, 3 Drawing Sheets

MIX/EFFECT STATUS DISPLAY

BACKGROUND OF THE INVENTION

The present invention relates to video signal processing, and more particularly to a mix/effect status display for providing an operator with more simultaneous status information without consuming the real estate necessary for the button/knob per function approach.

The current state of the art in video production switchers is to use buttons which modify the setup of a mix/effect (M/E) bank to indicate the current status for the setup parameters. This practice causes problems when there isn't enough room on the panel for a button or knob for every function. The common method of overcoming real estate limitations is to delegate controls between similar functions. For example one set of keyer setup buttons and knobs has traditionally been shared between all of the keyers on the same M/E bank. Status can only be displayed for one of the function groups—the status for other function groups is hidden. As production switchers become more complex, more delegation is required and more status is hidden from the operator.

What is desired is an M/E status display that provides the operator with much more simultaneous function group status without consuming the real estate necessary for the button/knob per function approach.

BRIEF SUMMARY OF THE INVENTION

Accordingly the present invention provides a mix/effect (M/E) status display that provides an operator with much more simultaneous status information without consuming additional real estate. The status display is provided next to the transition area at the end of the source control button rows. A working buffer that controls the video processing algorithms for the input video to produce the desired output video also provides status information to a status display driver so that any changes that occur which affect an M/E are immediately reflected on the status display. All of the buses coupled to the M/E are displayed with information about the current source coupled to the buses as well as the source control button rows that are active. Also information about a transition as well as the M/E operating mode are displayed. Together with the other information displayed an operator has a complete view of the status of the particular M/E.

The objects, advantages and other novel features of the present invention are apparent from the following detailed description when read in conjunction with the appended claims and attached drawing.

DETAILED DESCRIPTION OF THE INVENTION

Figure 1:
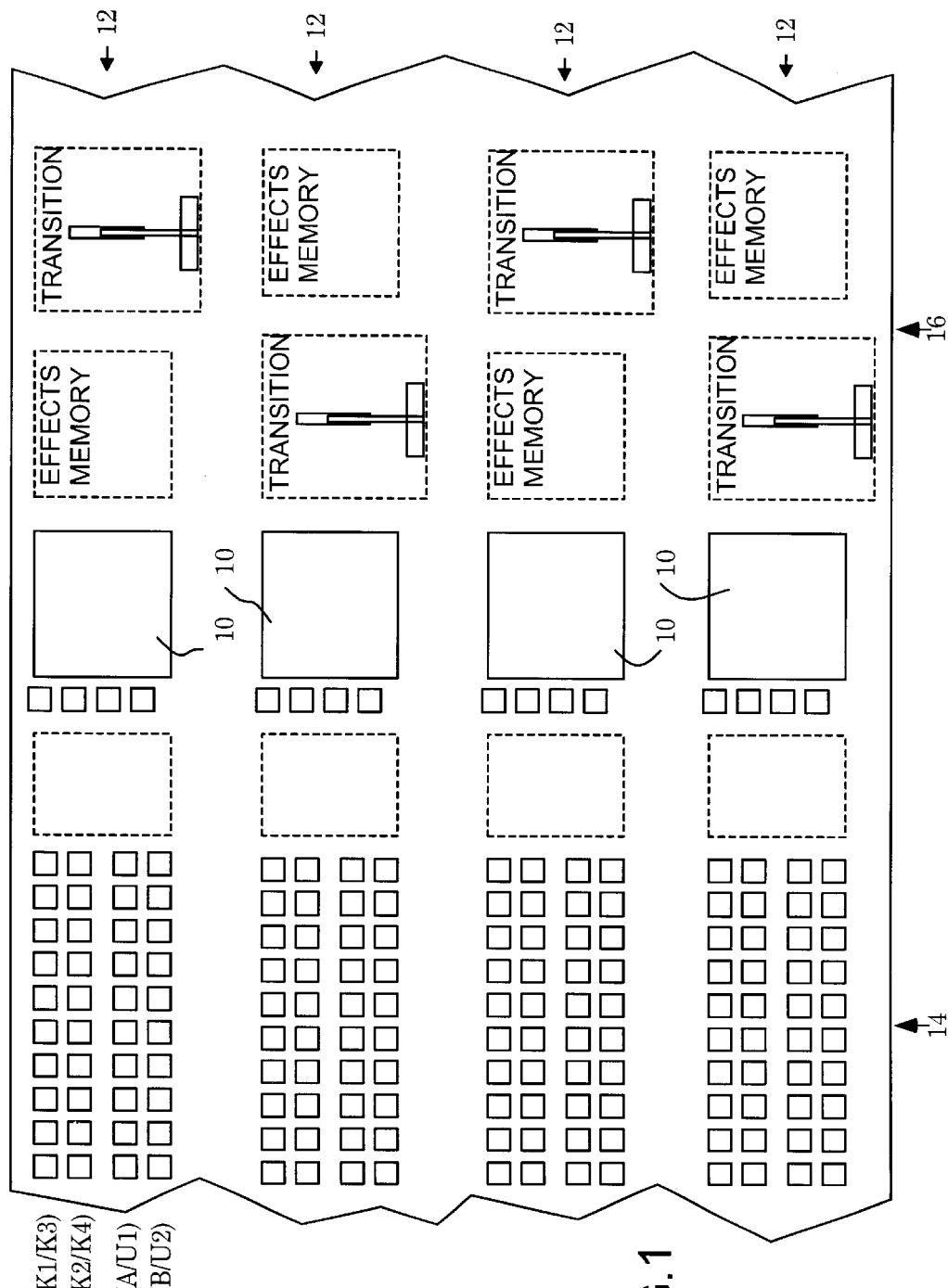
FIG. 1 is a partial plan view of a switcher control panel having M/E status displays according to the present invention.
Figure 2:
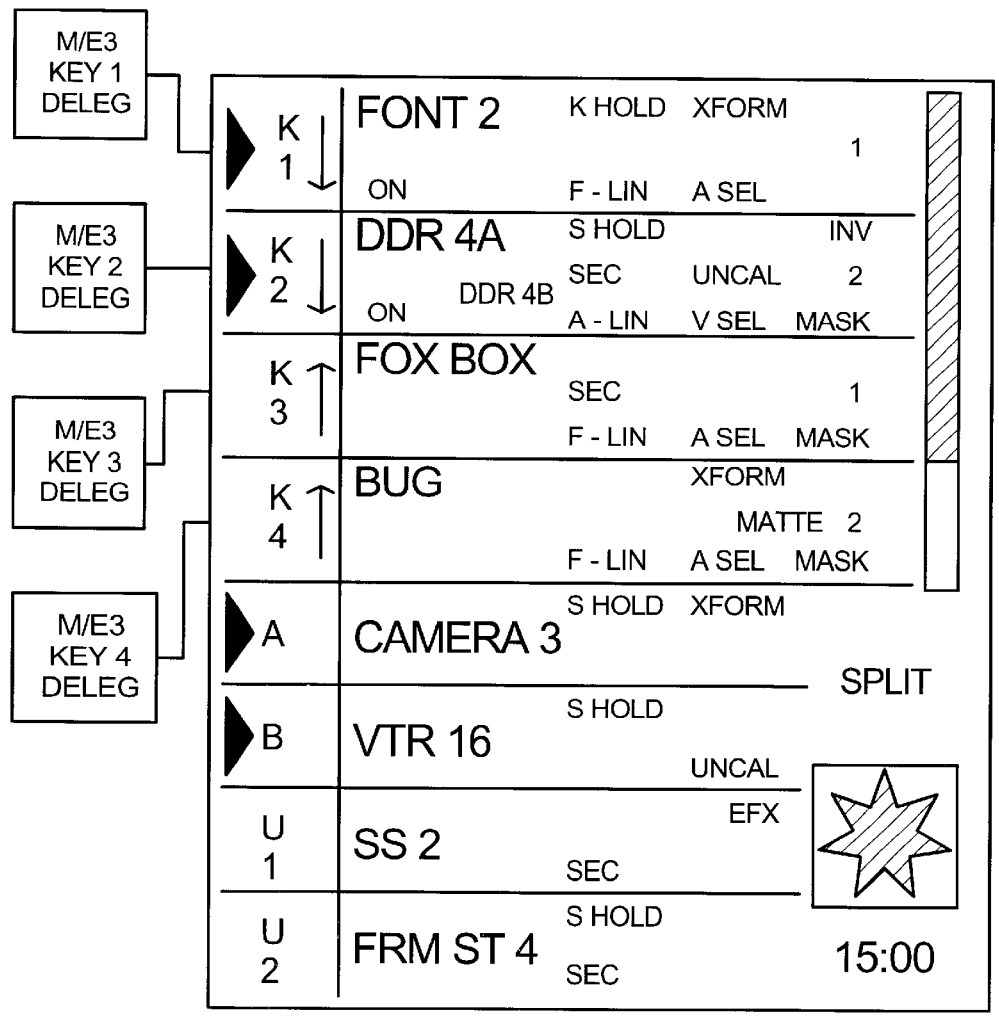
FIG. 2 is a plan view of an M/E status display according to the present invention.

Referring now to FIG. 1 a mix/effect (M/E) status display 10 is located in the middle of an M/E bank 12 between rows of source selection buttons 14 and a transition area 16. An M/E bank for which this status display may be used is disclosed in co-pending U.S. patent application Ser. No. 09/365,332, now U.S. Pat. No. 6,281,941. As shown in FIG. 2 the status display 10 shows a row of information for each bus or source select row coupled to the M/E bank (K1, K2, K3, K4, A, B, U1, U2) together with an indication (right facing triangle at the far left of the display) of which bus a source select button row is currently controlling. An alphanumeric source name is provided for the current selection of the eight main buses. At the right a transition bar is displayed with an indication as to the status of a given transition effect. Also the operating mode of the M/E bank is indicated ("SPLIT") as well as the type of transition (in the form of a small bit map) and the transition interval (in seconds and frames). The rest of the alphanumeric information displayed gives the operator a full knowledge of the complete configuration of the M/E bank including key priority, keyer mode, etc. Also shown are delegation buttons 18 to the left of the M/E status display 10 which are associated with each keyer as an aid to delegation of other areas of the switcher control panel.

Figure 3:
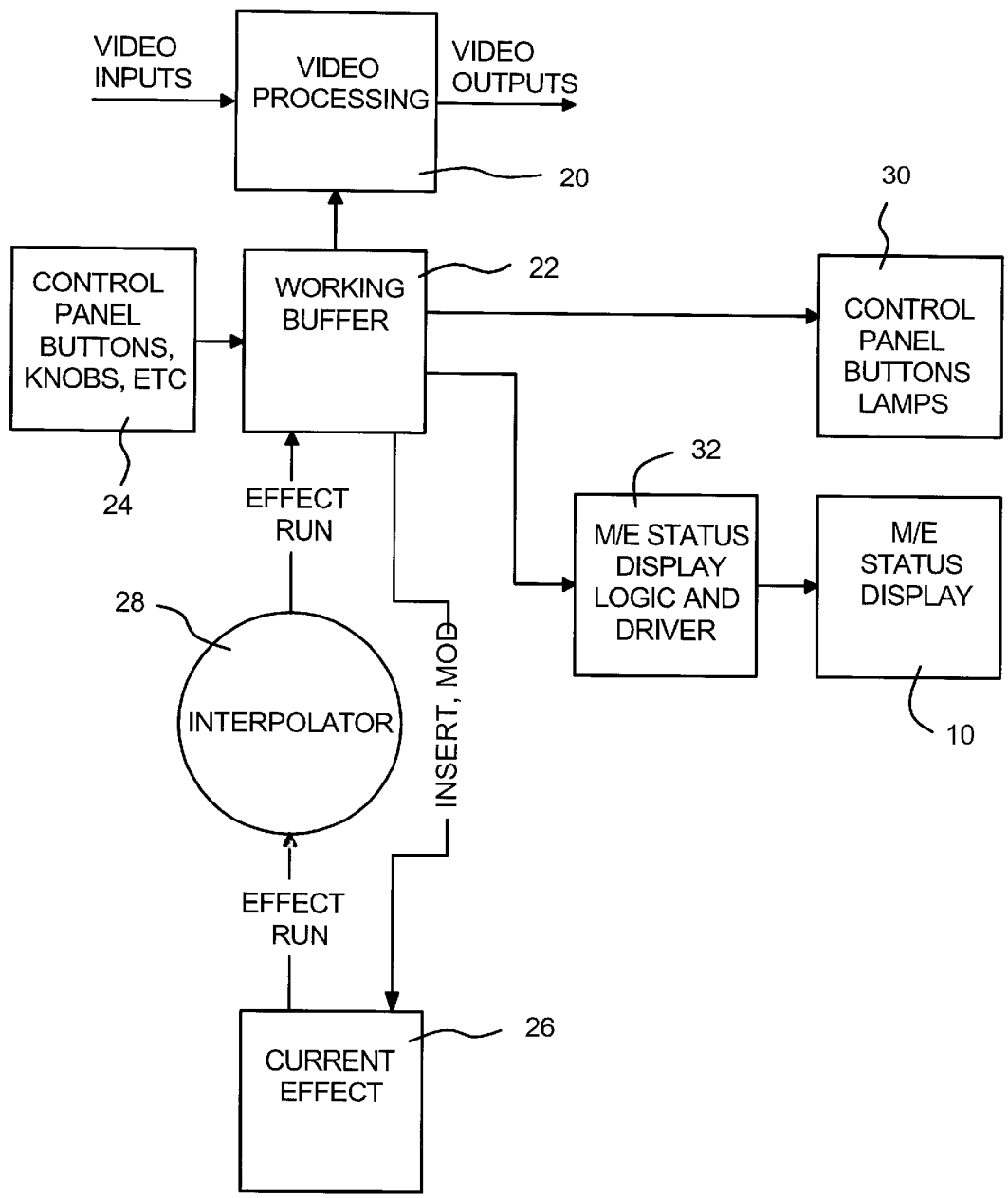
FIG. 3 is a block diagram view of a switcher architecture having M/E status displays according to the present invention.

Referring now to FIG. 3 a video processor 20 receives video input signals and provides video output signals that are altered according to the processing algorithm implemented. The particular algorithm implemented is controlled by a working buffer 22 that receives inputs from the control panel 24 and a working effects register (current effect) 26 via an interpolator 28, as necessary. The working buffer 22 also controls the control panel lamps 30 that indicate what functions are activated and an M/E status display driver 32 which in turn provides the M/E status display 10. The current effect register 26 may be updated from the working buffer 22 when preconfiguring effects. Therefore any changes that affect an M/E bank are reflected in the working buffer 22 and transferred to the status display 10 via the M/E driver 32.

Compared to the prior art production switchers, such as the Grass Valley Model 4000 switcher manufactured by Tektronix, Inc. at Nevada City, Calif., this new M/E status display provides over four times the information provided by each keyer setup panel and takes less panel real estate. Providing this display makes a higher degree of delegation acceptable to operators, i.e., only one keyer setup panel is required for 16 keyers in a four M/E bank configuration.

Thus the present invention provides a mix/effect status display for each mix/effect bank of a production switcher, which display provides complete setup information for each keyer and source for the M/E bank as well as transition information.

What is claimed is:

1. A video production switcher comprising:

a mix/effects bank, at least first, second, third and fourth buses coupled to the mix/effects bank, a control panel including at least first and second rows of source selector buttons, a first control element having a first state in which said first row of source selector buttons exercises control over the first bus and a second state in which said first row of source selector buttons exercises control over the second bus, and a second control element having a first state in which said second row of Source selector buttons exercises control over the third bus and a second state in which said second row of source selector buttons exercises control over the fourth bus, wherein the control panel includes a mix/effect status display having a bus status region with first and second display rows associated with said first and second buses respectively, each display row including indicia that identify the particular bus with which the display row is associated, the video source coupled to the particular bus, and whether said first row of source selector buttons exercises control over the particular bus, wherein the bus status region of the mix/effect status display includes third and fourth display rows associated with said third and fourth buses respectively, the third and fourth display rows each including indicia that identify the particular bus with which the display row is associated, the video source coupled to the particular bus, and whether said second row of source selector buttons exercises control over the particular bus, the mix/effect status display also has a transition status region that indicates a transition status, type and interval, and wherein the first and second display rows are substantially aligned with said first row to source selector buttons.

2. A video production switcher according to claim 1, comprising a working buffer for receiving information about the mix/effects bank and a mix/effect status display driver for receiving status information from the working buffer and employing the status information to operate the mix/effect status display.

* * * * *